United States Patent [19]

Crétin

[11] 4,331,847
[45] May 25, 1982

[54] APPARATUS FOR SELECTIVELY CONNECTING AND DISCONNECTING TWO SETS OF THREE-PHASE BUSBARS VIA ISOLATING SWITCH MEANS

[75] Inventor: Jean-Loup Crétin, Villeurbanne, France

[73] Assignee: Alsthom-Atlantique, Paris, France

[21] Appl. No.: 244,566

[22] Filed: Mar. 17, 1981

[30] Foreign Application Priority Data

Mar. 20, 1980 [FR] France ................ 80 06232

[51] Int. Cl.³ ........................... H01H 31/00
[52] U.S. Cl. ..................... 200/48 R; 200/155 R
[58] Field of Search ............ 200/48 A, 48 R, 48 P, 200/48 SB, 153 P, 6 R, 155 R, 165; 174/71 B, 72 B, 82 B; 335/190, 189

[56] References Cited

U.S. PATENT DOCUMENTS

| | | | |
|---|---|---|---|
| 3,206,562 | 9/1965 | Griggs et al. | 335/190 |
| 3,257,524 | 6/1966 | Eggers et al. | 335/189 |
| 3,546,356 | 12/1970 | Graybill | 174/71 B |
| 4,184,058 | 1/1980 | Irik et al. | 200/155 R |

FOREIGN PATENT DOCUMENTS 2539996 3/1977 Fed. Rep. of Germany .
2346884 10/1977 France .
2379900 9/1978 France .

Primary Examiner—Willis Little
Attorney, Agent, or Firm—Sughrue, Mion, Zinn, Macpeak and Seas

[57] ABSTRACT

Apparatus for selectively connecting and disconnecting two sets (1, 2) of three-phase busbars via isolating switch means, said sets of busbars being covered by metal cladding (31, 32), and extending in two different directions in a common plane (40) such that the centerlines of the two sets intersect, wherein the point of intersection is located within a metal sphere (41) having sleeve joints (41, 42) to which the cladding (31, 32) of the busbars is fixed, with the axes of the sleeve joints lying in said common plane (40) and wherein where they pass through the sphere, the busbars of one of the sets occupy a first plane parallel to said common plane and wherein the busbars of the other set occupy a second plane parallel to said common plane and on the other side thereof relative to said first plane, said isolating switch means being provided with contact rods (51) to connect corresponding bars of different sets together, said contact rods (51) lying in a plane which is perpendicular to said first and second planes and which is inclined relative to both of said different directions in which said sets of busbars extend.

2 Claims, 2 Drawing Figures

APPARATUS FOR SELECTIVELY CONNECTING AND DISCONNECTING TWO SETS OF THREE-PHASE BUSBARS VIA ISOLATING SWITCH MEANS

The invention relates to isolating switch apparatus for connecting together two sets of orthogonal busbars contained in metal cladding filled with dielectric gas such as sulphur hexafluoride.

BACKGROUND OF THE INVENTION

Switch gear contained in metal cladding filled with gas under pressure and including a plurality of sets of busbars, uses isolating switches to allow one set of busbars to communicate with another set disposed obliquely relative to the first set. These isolating switches are generally disposed on branch connections between metal cladding protecting a circuit-breaker and the cladding of a set of bars.

The assembly formed by the branch connections and their isolating switches is particularly bulky.

To make this assembly generally more compact, branch connections between sets of three-phase busbars in the same metal cladding can be used, but this is not very effective because the sets of busbars lie perpendicular one above another.

The invention aims to provide connection apparatus which is more compact.

SUMMARY OF THE INVENTION

The invention provides apparatus for selectively connecting and disconnecting two sets of three-phase busbars via isolating switch means, said sets of busbars being covered by metal cladding, and extending in two different directions in a common plane such that the centre-lines of the two sets intersect, wherein the point of intersection is located within a metal sphere having sleeve joints to which the cladding of the busbars is fixed, with the axes of the sleeve joints lying in said common plane and wherein where they pass through the sphere, the busbars of one of the sets occupy a first plane parallel to said common plane and wherein the busbars of the other set occupy a second plane parallel to said common plane and on the other side thereof relative to said first plane, said isolating switch means being provided with contact rods to connect corresponding bars of different sets together, said contact rods lying in a plane which is perpendicular to said first and second planes and which is inclined relative to both of said different directions in which said sets of busbars extend.

Since the sets of busbars are orthogonal, adjacent sleeve joints lie at 90° to one another. The alignments of the isolating switch rods are inclined at 45° to the directions of the sets of busbars. The isolator switch control mechanism is contained in a box fixed on a sleeve joint of the sphere which lies perpendicular to the plane formed by the axes of the other sleeve joints.

BRIEF DESCRIPTION OF THE DRAWING

An embodiment of the invention is described, by way of example, with reference to the accompanying drawing, in which.

DESCRIPTION OF PREFERRED EMBODIMENT

Figure 1:
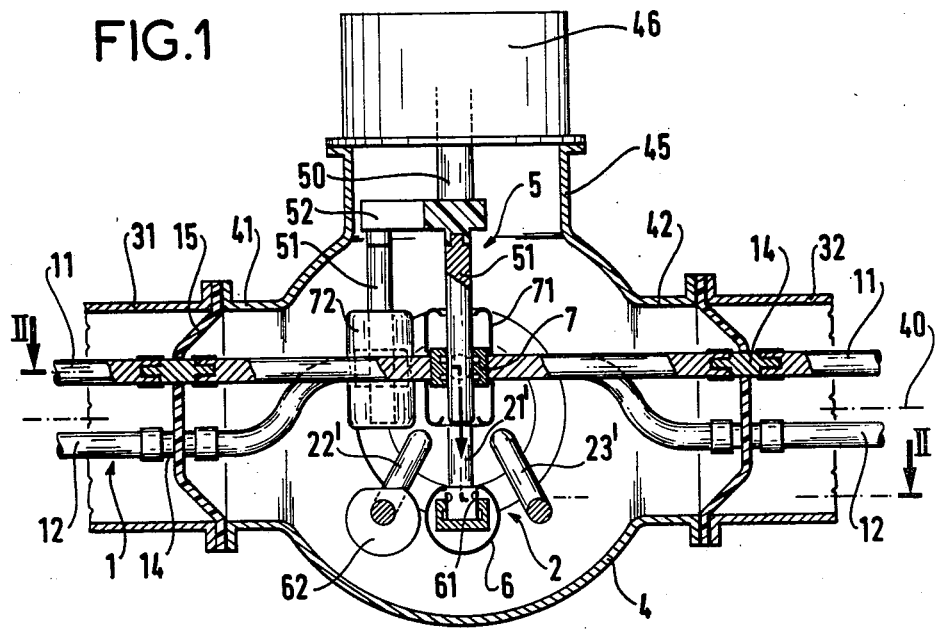
FIG. 1 is an elevation, partially in section through apparatus for connecting two orthogonal sets of busbars.
Figure 2:
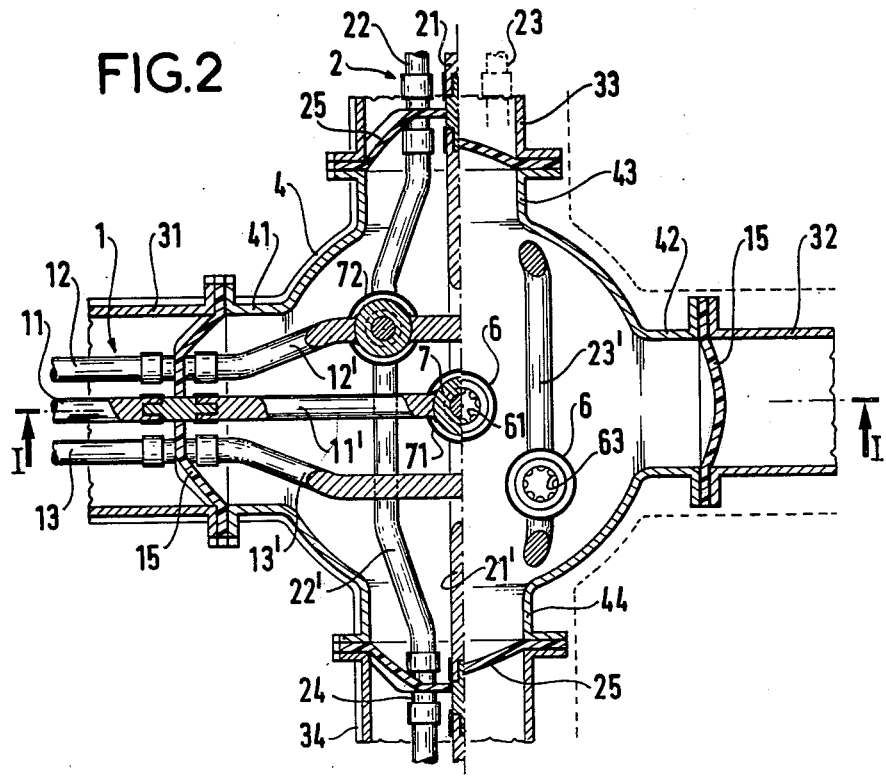
FIG. 2 is a horizontal sectional view through two different planes of FIG. 1, taken about lines II—II.

In the figures, a first set 1 of three-phase busbars is disposed inside metal tubes 31 and 32. The tubing 31,32 is generally co-axial with a center line extending between the busbars. A second set 2 of three-phase busbars is disposed inside metal tubes 33 and 34. The tubing 33,34 is generally co-axial with a center-line extending between the set of busbars 2, and the center-lines of the first and second sets 1 and 2 are orthogonal.

The metal tubes 31,32,33 and 34 are connected to a connection sphere 4 by four respective sleeve joints 41, 42, 43, 44. The axes of these sleeve joints, as well as those of the casings 31, 32, 33 and 34 lie in a plane 40 indicated by a chain-dotted line in FIG. 1. The assembly thus formed is filled with an insulating dielectric gas such as sulphur hexafluoride.

The first set 1 of busbars is constituted by an upper busbar 11 and two lower busbars 12 and 13. They are disposed at the vertices of an equilateral triangle whose base corresponds to the lower busbars 12 and 13 and is parallel to the plane 40 and whose centre coincides with the axis of their cladding constituted by the tubes 31 and 32. Likewise, the second set 2 of busbars is constituted by an upper busbar 21 and two lower busbars 22 and 23. These busbars are disposed at the vertices of an equilateral triangle whose base corresponds to the lower busbars 22 and 23 and is parallel to the plane 40. Busbars of each set are kept insulated and apart from one another by conductive feed-throughs such as 14 and 24 which pass through insulating diaphragms 15 and 25 held between the connection flanges which connect the tubes to the sleeve joints. Between the feed-throughs 14, the busbars 11, 12, 13 are connected together by connection rods 11', 12', 13' which lie in a plane parallel to and above plane 40. Between the feed-throughs 24, the busbars 21, 22, 23 are connected together by connection rods 21', 22', 23' disposed in a plane parallel to and below plane 40. The rods 11', 12', 13' and the rods 21', 22', 23' are placed at equal distances from the plane 40.

At the top of the sphere 4, there is a sleeve joint 45 perpendicular to the plane 40. The sleeve joint 45 is surmounted by a sealed box 46 which contains a control mechanism for an actuator rod 50 of a three-pole isolating switch which has three contact rods such as 51 supported by an insulating bar 52 integral with the actuator rod 50. The three contact rods 51 are disposed perpendicular to the plane 40 and in line with the projection of the points of intersection in the plane 40 of the pairs of rods 11' and 21', 12' and 22', 13' and 23'. At these points, the lower rods 21', 22' and 23' are provided with contact elements 6 formed e.g. by means of two halfshells which surround the rods. Each contact element 6 is equipped with a ring of contact fingers 61 and is surrounded by a discharge arrester cap such as 62 and 63. As for the upper rods 11', 12', 13', they are fitted with contact elements 7 having discharge arrester caps such as 71 and 72. The contact rods 51 are mounted to slide through the contact elements 7 and during the operation of the isolating switch 5, their ends are either brought into contact with the contact fingers 61, or else they are taken out of contact therewith.

In the configuration described, the three contact rods 51 lie in a plane at 45° relative to the centre lines of both sets of busbars.

Such a configuration provides great space saving since the connection sphere acts simultaneously to provide passage for two sets of conductive busbars which are perpendicular to one another and as a housing for the isolating switch.

I claim:

1. An apparatus for selectively connecting and disconnecting two sets of three-phase busbars via isolating switch means, said sets of busbars being covered by metal cladding and extending in two different directions in a common plane such that the center-lines of the two sets intersect, the improvement wherein:

said metal cladding comprises metal tubes surrounding said sets of busbars and extending parallel to respective sets, a metal sphere joining said metal tubes at the intersection of said sets of busbars, sleeve joints at the intersection of said metal sphere with the ends of said metal tubes, the axes of the sleeve joints lying in said common plane, and wherein said sets of three-phase busbars extend uninterrupted through said sphere with the busbars of one of the sets occupying a first plane parallel to said common plane and to one side thereof, and wherein the busbars of the other set occupy a second plane parallel to said common plane on the opposite side of said common plane to that occupied by busbars of said one set, and wherein said isolating switch means comprises contact rods lying in a plane perpendicular to the first and second planes and movable to selectively connect corresponding bars of the different sets together, and wherein said contact rods defining a plane which is perpendicular to the first and second planes, and which is inclined relative to the center-line of the sets of uninterrupted bars extending through said metal sphere;

whereby, said isolating switch functions to connect or disconnect the busbars of respective sets without interruption of any of the busbars of either set when the isolating switch is off.

2. The apparatus as claimed in claim 1, wherein both sets of busbars comprise busbars disposed at the vertices of an equilateral triangle and disposed within said tubing, and wherein, within said sphere, said busbars emerge into a common plane on given sides of said center-line and with busbars to respective sides of a center busbar for each set spaced laterally outwardly of each other to a greater extent within said sphere at the locations of said contact rods in contrast to their lateral positions with respect to the same center busbar within said metal tubes.

* * * * *